(12) United States Patent
Chaudhry et al.

(10) Patent No.: US 7,114,060 B2
(45) Date of Patent: Sep. 26, 2006

(54) SELECTIVELY DEFERRING INSTRUCTIONS ISSUED IN PROGRAM ORDER UTILIZING A CHECKPOINT AND MULTIPLE DEFERRAL SCHEME

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 455 days.

(21) Appl. No.: 10/686,061

(22) Filed: Oct. 14, 2003

(65) Prior Publication Data

US 2005/0081195 A1    Apr. 14, 2005

(51) Int. Cl.
*G06F 9/38* (2006.01)

(52) U.S. Cl. .................. 712/219; 712/216; 712/215

(58) Field of Classification Search ........... 712/244, 712/227
See application file for complete search history.

(56) References Cited

U.S. PATENT DOCUMENTS

| 5,471,591 | A | * | 11/1995 | Edmondson et al. | ....... | 712/217 |
| 5,751,985 | A | | 5/1998 | Shen et al. | ................. | 395/394 |
| 5,881,280 | A | * | 3/1999 | Gupta et al. | ................ | 712/244 |
| 5,966,530 | A | * | 10/1999 | Shen et al. | ................ | 712/244 |
| 2001/0029590 | A1 | | 10/2001 | Sager et al. | ................ | 713/501 |

FOREIGN PATENT DOCUMENTS

EP    0 357 188    7/1990

OTHER PUBLICATIONS

IBM Technical Disclosure Bulletin entitled "Deferred decodeing", vol. 27, No. 10B, Mar. 1985 IBM Corp., pp. 6257-6258, XP-000885126.
Publication entitled "Runahead Execution: An Alternative to Very Large Instruction Windows for Out-of-order Processors", by Onur Mutlu et al., Proceedings of The Ninth International Symposium on High-Performance computer Architeture, IEEE, 2002.
Publication entitled "Beating in-order Stalls with "Flea-Flicker" two-pass Pipelining", by Ronald D. Barnes et al., Proceedings of the 36th International Symposium on Microarchitecture, IEEE, 2003.

* cited by examiner

*Primary Examiner*—Richard L. Ellis
*Assistant Examiner*—George D. Zalepa
(74) *Attorney, Agent, or Firm*—Park, Vaughan & Fleming, LLP

(57) ABSTRACT

One embodiment of the present invention provides a system that facilitates deferring execution of instructions with unresolved data dependencies as they are issued for execution in program order. During a normal execution mode, the system issues instructions for execution in program order. Upon encountering an unresolved data dependency during execution of an instruction, the system generates a checkpoint that can subsequently be used to return execution of the program to the point of the instruction. Next, the system executes subsequent instructions in an execute-ahead mode, wherein instructions that cannot be executed because of an unresolved data dependency are deferred, and wherein other non-deferred instructions are executed in program order.

23 Claims, 2 Drawing Sheets

SELECTIVELY DEFERRING INSTRUCTIONS ISSUED IN PROGRAM ORDER UTILIZING A CHECKPOINT AND MULTIPLE DEFERRAL SCHEME

BACKGROUND

1. Field of the Invention

The present invention relates to techniques for improving the performance of computer systems. More specifically, the present invention relates to a method and an apparatus for speeding up program execution by selectively deferring execution of instructions with unresolved data-dependencies as they are issued for execution in program order.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two (L2) cache or memory can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers that are available for register renaming purposes during out-of-order execution also limits the effective size of the issue queue.

Some designers have proposed a scout-ahead execution mode, wherein instructions are speculatively executed to prefetch future loads, but wherein results are not committed to the architectural state of the processor. For example, see U.S. Pat. No. 6,415,356, entitled "Method and Apparatus for Using an Assist Processor to Pre-Fetch Data Values for a Primary Processor," by inventors Shailender Chaudhry and Marc Tremblay. This solution to the latency problem eliminates the complexity of the issue queue and the rename unit, and also achieves memory-level parallelism. However, it suffers from the disadvantage of having to re-compute any computational operations that are performed while in scout-ahead mode.

Hence, what is needed is a method and an apparatus for hiding memory latency without the above-described drawbacks of existing processor designs.

SUMMARY

One embodiment of the present invention provides a system that facilitates deferring execution of instructions with unresolved data dependencies as they are issued for execution in program order. During a normal execution mode, the system issues instructions for execution in program order. Upon encountering an unresolved data dependency during execution of an instruction, the system generates a checkpoint that can subsequently be used to return execution of the program to the point of the instruction. Next, the system executes subsequent instructions in an execute-ahead mode, wherein instructions that cannot be executed because of an unresolved data dependency are deferred, and wherein other non-deferred instructions are executed in program order.

In a variation on this embodiment, if the unresolved data dependency is resolved during execute-ahead mode, the system enters a deferred execution mode, wherein the system executes deferred instructions. If all deferred instructions are executed during this deferred execution mode, the system returns to normal execution mode to resume normal program execution from the point where the execute-ahead mode left off.

In a further variation, executing deferred instructions in the deferred execution mode involves: issuing deferred instructions for execution in program order relative to the other deferred instructions (but out-of-order relative to other previously executed instructions); deferring execution of deferred instructions that still cannot be executed because of unresolved data dependencies; and executing other deferred instructions that able to be executed in program order.

In a further variation, if some deferred instructions are again deferred, the system returns to execute-ahead mode at the point where execute-ahead mode left off.

In a further variation, generating the checkpoint involves saving the precise architectural state of the processor to facilitate subsequent recovery from exceptions that arise during execute-ahead mode or deferred mode.

In a variation on this embodiment, the system keeps track of data dependencies while executing instructions to facilitate determining if an instruction is subject to an unresolved data dependency. Keeping track of data dependencies can involve maintaining state information for each register, wherein the state information indicates whether or not a value in the register depends on an unresolved data-dependency.

In a variation on this embodiment, the unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

In a variation on this embodiment, if the system encounters a non-data-dependent stall condition while executing in normal mode or execute-ahead mode, the system moves to a scout-ahead mode. In scout-ahead mode, instructions are speculatively executed to prefetch future loads, but results are not committed to the architectural state of the processor. When the launch point stall condition (the unresolved data dependency or the non-data dependent stall condition that originally caused the system to move out of normal execution mode) is finally resolved, the system uses the checkpoint to resume execution in normal mode from the launch point instruction (the instruction that originally encountered the launch point stall condition).

In a further variation, the non-data-dependent stall condition can include: a memory barrier operation; a load buffer full condition; and a store buffer full condition.

In a variation on this embodiment, the system stores deferred instructions in a deferred buffer that is organized as a first-in first-out buffer.

In a variation on this embodiment, the system issues instructions for execution in program order from an instruction buffer that is organized as a first-in first-out buffer.

Note that the present invention has a number of advantages over traditional out-of-order designs. First, the instruction buffers are simple first-in-first-out (FIFO) buffers, which unlike conventional out-of-order execution windows, do not require complex circuitry for content-addressable-memory (CAM) operations. Moreover, the FIFO buffers are common SRAM cells with a single read port and a single write port. Thus, their area grows linearly with their size, and hence permits storage of thousands of deferred instructions. In fact, given the density advantages of SRAM, these thousands of instructions can be stored in the same area as is used by a traditional out-of-order issue queue, which may only store only 128 instruction. (Note that although the above-described embodiment of the present invention uses FIFO buffers to implement both instruction buffer 108 and deferred buffer 112, other non-FIFO structures, such as SRAM, can be used to implement instruction buffer 108 and deferred buffer 112.)

Second, only dependent instructions are retained in the deferred buffer, because independent data-ready instructions are executed at once. This saves chip resources. Note that in traditional out-of-order designs, data-ready instructions that have issued continue to consume space in the issue queue (or equivalent structure) until they are retired.

Moreover, renaming of architectural registers to physical registers is not necessary, and so the complexity of the rename unit can be dispensed with. This means that the size of the out-of-order window is not limited by the register file size. Hence, the present invention facilitates extending out-of-order execution to a potentially unlimited number of instructions.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Processor

Figure 1A:
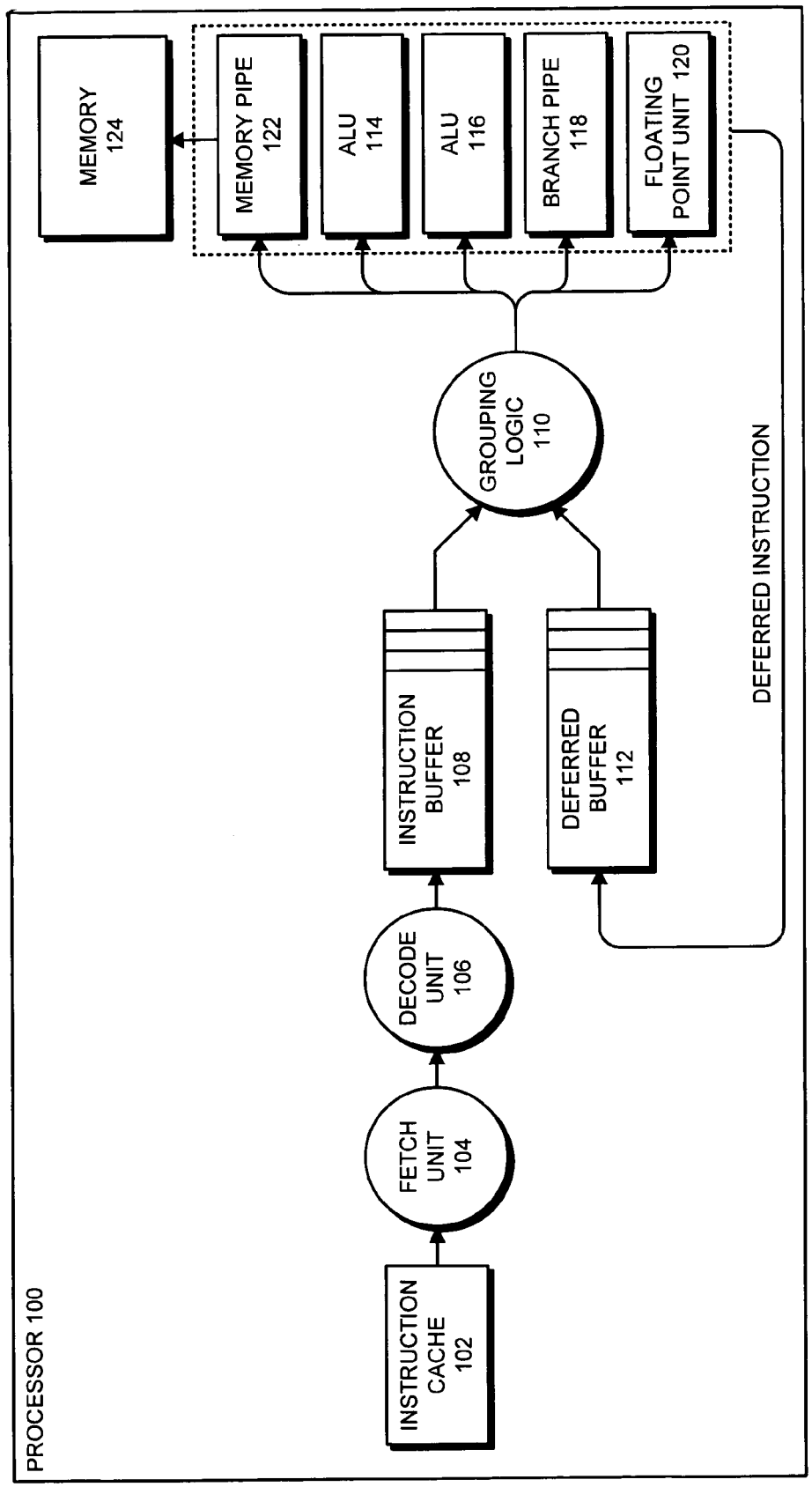
FIG. 1A illustrates a processor in accordance with an embodiment of the present invention.

FIG. 1A illustrates the design of a processor 100 in accordance with an embodiment of the present invention. Processor 100 can generally include any type of processor, including, but not limited to, a microprocessor, a mainframe computer, a digital signal processor, a personal organizer, a device controller and a computational engine within an appliance. As is illustrated in FIG. 1, processor 100 includes instruction cache 102, fetch unit 104, decode unit 106, instruction buffer 108, deferred buffer 112, grouping logic 110, memory 113, arithmetic logic unit (ALU) 114, ALU 116, branch pipe 118 and floating point unit 120.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves conditional branch computations), and floating point unit 120.

If an instruction cannot be executed due to an unresolved data dependency, such as an operand that has not returned from a load operation, the system defers execution of the instruction and moves the instruction into deferred buffer 112. Note that like instruction buffer 108, deferred buffer 112 is also organized as a FIFO buffer.

When the data dependency is eventually resolved, instructions from deferred buffer 112 are executed in program order with respect to other deferred instructions, but not with respect to other previously executed non-deferred instructions. This process is described in more detail below with reference to FIG. 2.

Keeping Track of Dependencies

The present invention keeps track of data dependencies in order to determine if an instruction is subject to an unresolved data dependency. In one embodiment of the present invention, this can involve maintaining state information for each register, which indicates whether or not a value in the register depends on an unresolved data dependency.

Figure 1B:
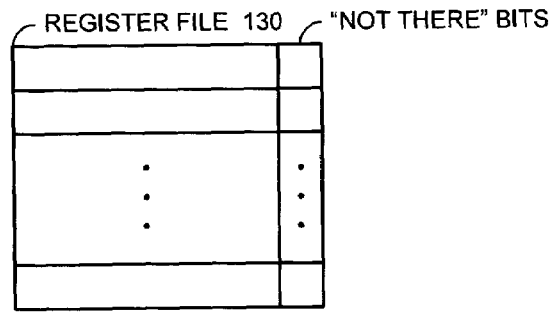
FIG. 1B illustrates a register file in accordance with an embodiment of the present invention.

For example, FIG. 1B illustrates a register file 130 in accordance with an embodiment of the present invention. Each register in register file 130 is associated with a "not-there" bit, which keeps track of whether a valid operand value is contained in the register, or if the operand cannot be produced because of an unresolved data dependency. For example, if the register is waiting for an operand to return from a load operation, the corresponding not-there bit is set to indicate that the desired operand value is not present in the register. When a subsequent instruction references a source operand value that is marked as not-there, and generates a result that is stored in a destination register, the system marks the destination register as not-there to indicate that the value in the destination register also depends on the unresolved data-dependency. This can be accomplished by marking the not-there bit of the destination register with the "OR" of the not-there bits for source registers of the instruction.

State Diagram

Figure 2:
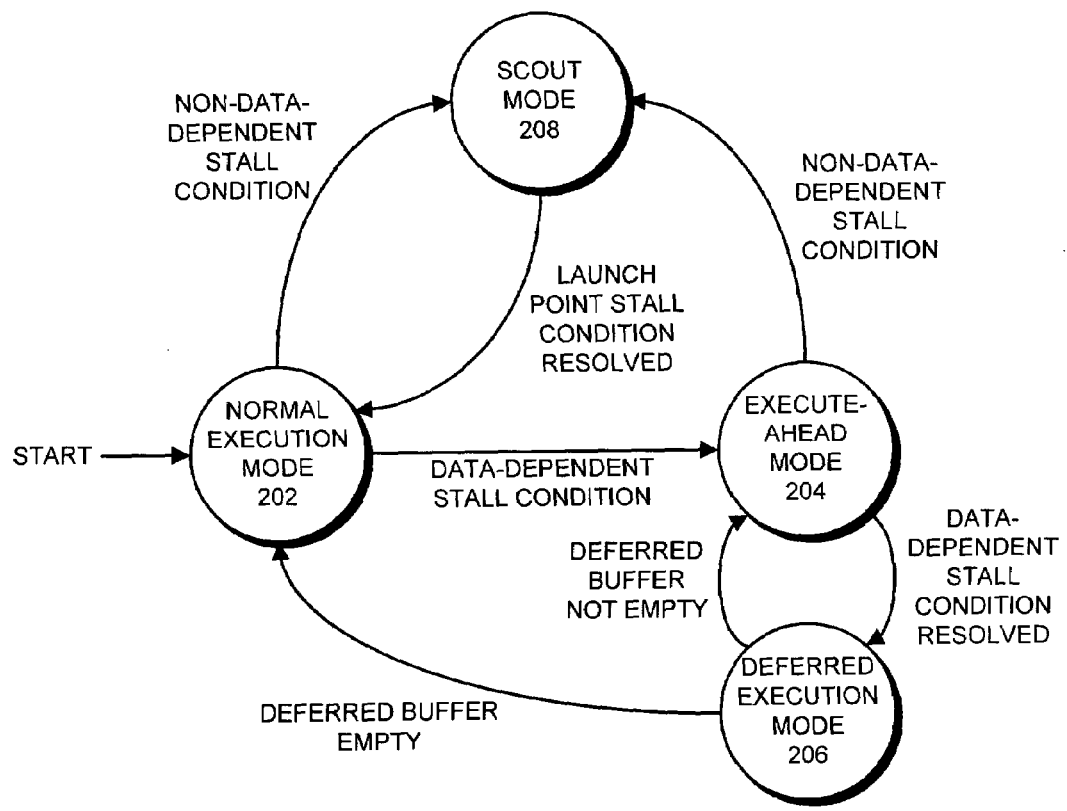
FIG. 2 presents a state diagram which includes the execute-ahead mode in accordance with an embodiment of the present invention.

FIG. 2 presents a state diagram which includes the execute-ahead mode in accordance with an embodiment of the present invention. The system starts in normal execution mode 202, wherein instructions are executed in program order as they are issued from instruction buffer 108 (see FIG. 1).

Next, if an unresolved data dependency arises during execution of an instruction, the system moves to execute-ahead mode 204. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 204, the system performs a checkpointing operation to generate a checkpoint that can be used, if necessary, to return execution of the process to the point where the unresolved data dependency was encountered; this point is referred to as the "launch point." (Note that generating the checkpoint can involve saving the precise architectural state of the processor to facilitate subsequent recovery from exceptions that arise during execute-ahead mode or deferred mode.) The system also "defers" execution of the instruction that encountered the unresolved data dependency, and stores the deferred instruction in deferred buffer 112.

Within execute-ahead mode 204, the system continues to execute instructions in program order as they are received from instruction buffer 108, and any instructions that cannot execute because of an unresolved data dependency are stored in deferred buffer 112.

When the system is in execute-ahead mode 204, if an unresolved data dependency is finally resolved, the system moves into deferred execution mode 206, wherein instructions are executed in program order from deferred buffer 112. During deferred execution mode 206, the system attempts to execute deferred instructions from deferred buffer 112. Note that the system attempts to execute these instructions in program order with respect to other deferred instructions in deferred buffer 112, but not with respect to other previously executed non-deferred instructions (and not with respect to deferred instructions executed in previous passes through deferred buffer 112). During this process, the system defers execution of deferred instructions that still cannot be executed because of unresolved data dependencies and places these again-deferred instruction back into deferred buffer 112. The system executes the other instruction that can be executed in program order with respect to each other.

After the system completes a pass through deferred buffer 112, if deferred buffer 112 is empty, the system moves back into normal execution mode 202. This may involve committing changes made during execute-ahead mode 204 and deferred execution mode 206 to the architectural state of the processor, if such changes have not been already committed. It can also involve throwing away the checkpoint generated when the system moved into execute-ahead mode 204.

On the other hand, if deferred buffer 112 is not empty after the system completes a pass through deferred buffer 112, the system returns to execute ahead mode to execute instructions from instruction buffer 108 from the point where the execute-ahead mode 204 left off.

If a non-data dependent stall condition arises while the system is in normal execution mode 202 or in execute-ahead mode 204, the system moves into scout mode 208. (This non-data-dependent stall condition can include: a memory barrier operation; a load buffer full condition; a store buffer full condition, or a deferred buffer full condition.) In scout mode 208, instructions are speculatively executed to prefetch future loads, but results are not committed to the architectural state of the processor.

Scout mode is described in more detail in U.S. Pat. No. 6,415,356, entitled "Method and Apparatus for Using an Assist Processor to Pre-Fetch Data Values for a Primary Processor," by inventors Shailender Chaudhry and Marc Tremblay. It is also described in U.S. Provisional Application No. 60/436,539, entitled, "Generating Prefetches by Speculatively Executing Code Through Hardware Scout Threading," by inventors Shailender Chaudhry and Marc Tremblay (filed 24 Dec. 2002). It is additionally described in U.S. Provisional Application No. 60/436,492, entitled, "Performing Hardware Scout Threading in a System that Supports Simultaneous Multithreading," by inventors Shailender Chaudhry and Marc Tremblay (filed 24 Dec. 2002). The above listed references are hereby incorporated by reference herein to provide details on how scout mode operates.

Unfortunately, computational operations performed during scout-ahead mode need to be recomputed again, which can require a large amount of computational work.

When the original "launch point" stall condition is finally resolved, the system moves back into normal mode 202, and, in doing so, uses the previously generated checkpoint to resume execution from the launch point instruction (the instruction that initially encountered the stall condition).

Note that the launch point stall condition is the stall condition that originally caused the system to move out of normal execution mode 202. For example, the launch point stall condition can be the data-dependent stall condition that caused the system to move from normal execution mode 202 to execute-ahead mode 204, before moving to scout mode 208. Alternatively, the launch point stall condition can be the non-data-dependent stall condition that caused the system to move directly from normal execution mode 202 to scout mode 208.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for deferring execution of instructions with unresolved data dependencies as they are issued for execution in program order, comprising:

issuing instructions for execution in program order during a normal execution mode; and upon encountering an unresolved data dependency during execution of an instruction, generating a checkpoint that can subsequently be used to return execution of the program to the point of the instruction, and executing subsequent instructions in an execute-ahead mode, wherein instructions that cannot be executed because of an unresolved data dependency are deferred, and wherein other non-deferred instructions are executed in program order;

wherein if a non-data-dependent stall condition is encountered while executing in normal mode or execute-ahead mode, the method further comprises;

moving to a scout mode, wherein instructions are speculatively executed to prefetch future loads, but wherein results are not committed to the architectural state of the processor; and when the launch point stall condition (the unresolved data dependency or the non-data dependent stall condition that originally caused the system to move out of normal execution mode) is finally resolved, using the checkpoint to resume execution in normal mode from the launch point instruction (the instruction that originally encountered the launch point stall condition).

2. The method of claim 1, wherein if the unresolved data dependency is resolved during execute-ahead mode, the method further comprises:

executing deferred instructions in a deferred execution mode; and if all deferred instructions are executed, returning to the normal execution mode to resume normal program execution from the point where the execute-ahead mode left off.

3. The method of claim 2, wherein executing deferred instructions in the deferred execution mode involves:

issuing deferred instructions for execution in program order;

deferring execution of deferred instructions that still cannot be executed because of unresolved data dependencies; and executing other deferred instructions that are able to be executed in program order.

4. The method of claim 3, wherein if some deferred instruction are deferred again, the method further comprises returning to execute-ahead mode at the point where execute-ahead mode left off.

5. The method of claim 2, wherein generating the checkpoint involves saving a precise architectural state of the processor to facilitate subsequent recovery from exceptions that arise during execute-ahead mode or deferred mode.

6. The method of claim 1, wherein executing instructions involves keeping track of data dependencies to facilitate determining if an instruction is subject to an unresolved data dependency.

7. The method of claim 6, wherein keeping track of data dependencies involves maintaining state information for each register, which indicates whether or not a value in the register depends on an unresolved data-dependency.

8. The method of claim 1, wherein the unresolved data dependency can include:

a use of an operand that has not returned from a preceding load miss;

a use of an operand that has not returned from a preceding translation lookaside buffer (TLB) miss;

a use of an operand that has not returned from a preceding full or partial read-after-write (RAW) from store buffer operation; and a use of an operand that depends on another operand that is subject to an unresolved data dependency.

9. The method of claim 1, wherein the non-data-dependant stall condition can include:

a memory barrier operation;

a load buffer full condition; and a store buffer full condition.

10. The method of claim 1, wherein deferring instructions involves storing instructions in a deferred buffer that is organized as a first-in first-out buffer.

11. The method of claim 1, wherein issuing instructions for execution in program order involves issuing instructions from an instruction buffer that is organized as a first-in first-out buffer.

12. An apparatus that defers execution of instructions with unresolved data dependencies as they are issued for execution in program order, comprising:

an execution mechanism configured to issue instructions for execution in program order during a normal execution mode;

a detection mechanism configured to detect an unresolved data dependency;

wherein if an unresolved data dependency is detected during execution of an instruction, the execution mechanism is configured to, generate a checkpoint that can subsequently be used to return execution of the program to the point of the instruction, and to execute subsequent instructions in an execute-ahead mode, wherein instructions that cannot be executed because of an unresolved data dependency are deferred, and wherein other non-deferred instructions are executed in program order;

wherein if a non-data-dependent stall condition is encountered while executing in normal mode or execute-ahead mode, the execution mechanism is configured to move into a scout mode;

wherein during scout mode instructions are speculatively executed to prefetch future loads, but results are not committed to the architectural state of the processor; and wherein during scout mode when the launch point stall condition (the unresolved data dependency or the non-data dependent stall condition that originally caused the system to move out of normal execution mode) is finally resolved, the checkpoint is used to resume execution in normal mode from the launch point instruction (the instruction that originally encountered the launch point stall condition).

13. The apparatus of claim 12, wherein if the unresolved data dependency is resolved during execute-ahead mode, the execution mechanism is configured to execute deferred instructions in a deferred execution mode; and wherein if all deferred instructions are executed during deferred execution mode, the execution mechanism is configured to return to normal execution mode to resume normal program execution from the point where the execute-ahead mode left off.

14. The apparatus of claim 13, wherein while executing deferred instructions in the deferred execution mode, the execution mechanism is configured to:

issue deferred instructions for execution in program order;

defer execution of deferred instructions that still cannot be executed because of unresolved data dependencies; and to execute other deferred instructions that are able to be executed in program order.

15. The apparatus of claim 14, wherein if some deferred instruction are deferred again, the execution mechanism is configured to return to execute-ahead mode at the point where execute-ahead mode left off.

16. The apparatus of claim 13, wherein while generating the checkpoint, the execution mechanism is configured to save a precise architectural state of the processor to facilitate subsequent recovery from exceptions that arise during execute-ahead mode or deferred mode.

17. The apparatus of claim 12, wherein the execution mechanism is configured to keep track of data dependencies to facilitate determining if an instruction is subject to an unresolved data dependency.

18. The apparatus of claim 17, wherein while keeping track of data dependencies, the execution mechanism is configured to maintaining state information for each register, which indicates whether or not a value in the register depends on an unresolved data-dependency.

19. The apparatus of claim 12, wherein the unresolved data dependency can include:
   a use of an operand that has not returned from a preceding load miss;
   a use of an operand that has not returned from a preceding translation lookaside buffer (TLB) miss;
   a use of an operand that has not returned from a preceding full or partial read-after-write (RAW) from store buffer operation; and
   a use of an operand that depends on another operand that is subject to an unresolved data dependency.

20. The apparatus of claim 12, wherein the non-data-dependent stall condition can include:
   a memory barrier operation;
   a load buffer full condition; and
   a store buffer full condition.

21. The apparatus of claim 12, further comprising a deferred buffer for storing deferred instructions, wherein the deferred buffer is organized as a first-in first-out buffer.

22. The apparatus of claim 12, further comprising an instruction buffer for storing instructions to be issued for execution in program order, wherein the instruction buffer is organized as a first-in first-out buffer.

23. A microprocessor that defers execution of instructions with unresolved data dependencies as they are issued for execution in program order, comprising:
   a microprocessor chip containing one or more microprocessor cores;
   an execution mechanism within a microprocessor core configured to issue instructions for execution in program order during a normal execution mode;
   a detection mechanism within the microprocessor core configured to detect an unresolved data dependency during execution of an instruction;
   wherein if an unresolved data dependency is detected during execution of an instruction, the execution mechanism is configured to,
      generate a checkpoint that can subsequently be used to return execution of the program to the point of the instruction, and to
      execute subsequent instructions in an execute-ahead mode, wherein instructions that cannot be executed because of an unresolved data dependency are deferred, and wherein other non-deferred instructions are executed in program order;
   wherein if a non-data-dependent stall condition is encountered while executing in normal mode or execute-ahead mode, the execution mechanism is configured to move into a scout mode;
   wherein during scout mode instructions are speculatively executed to prefetch future loads, but results are not committed to the architectural state of the processor; and
   wherein during scout mode when the launch point stall condition (the unresolved data dependency or the non-data dependent stall condition that originally caused the system to move out of normal execution mode) is finally resolved, the checkpoint is used to resume execution in normal mode from the launch point instruction (the instruction that originally encountered the launch point stall condition).

* * * * *